Patented Oct. 31, 1939

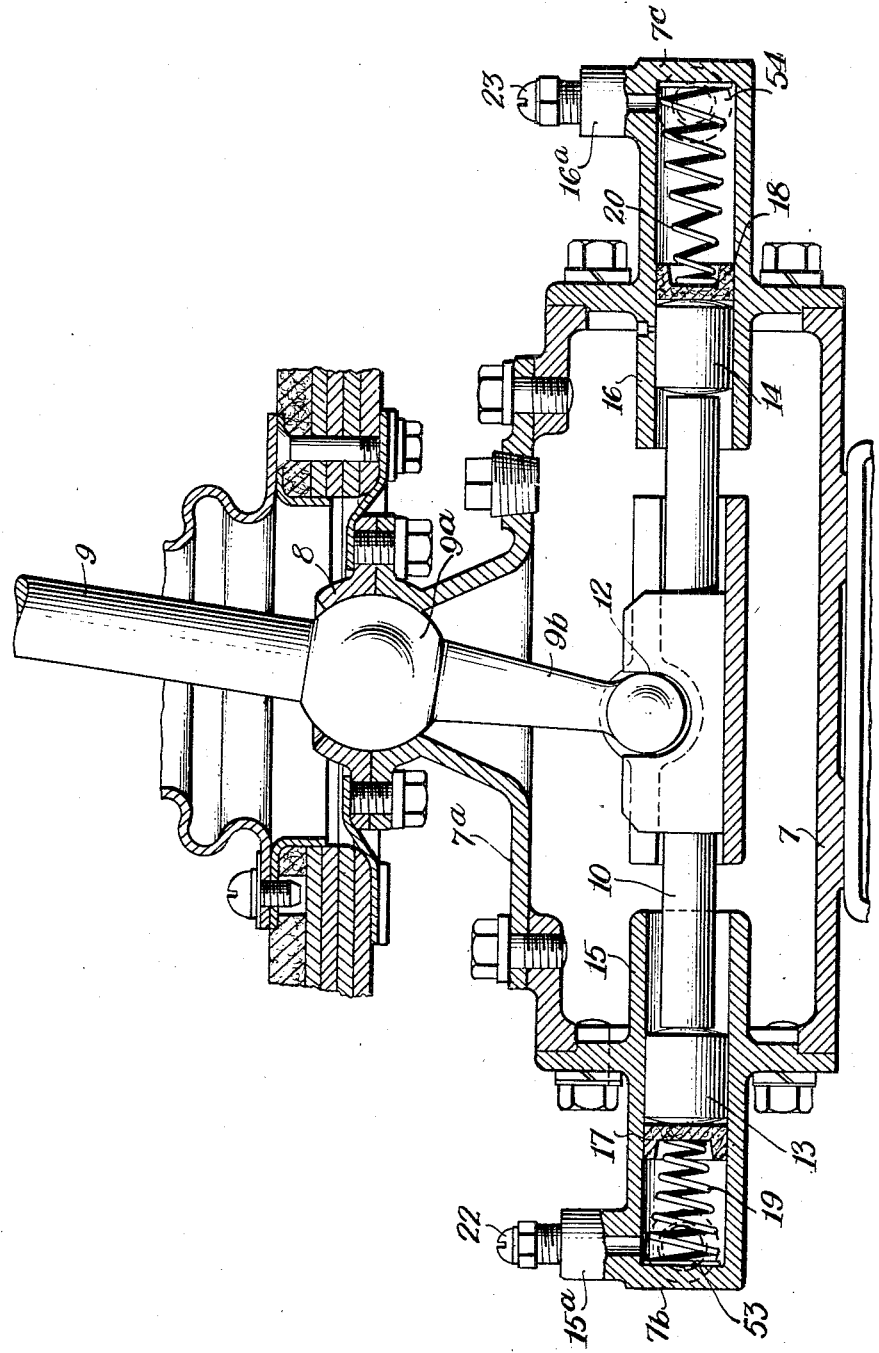

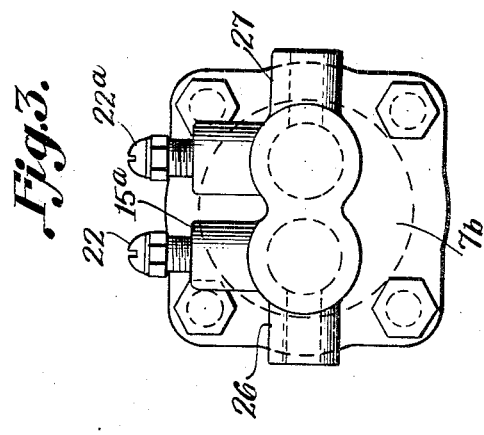
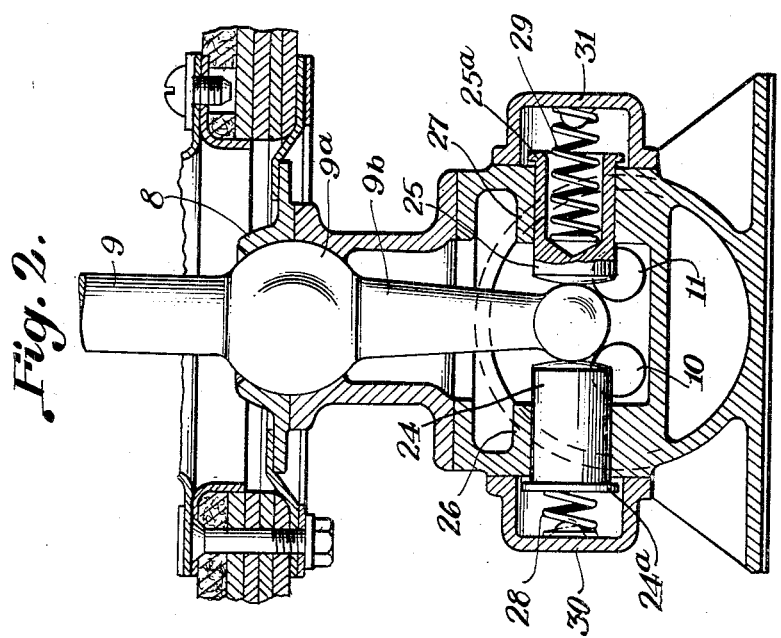

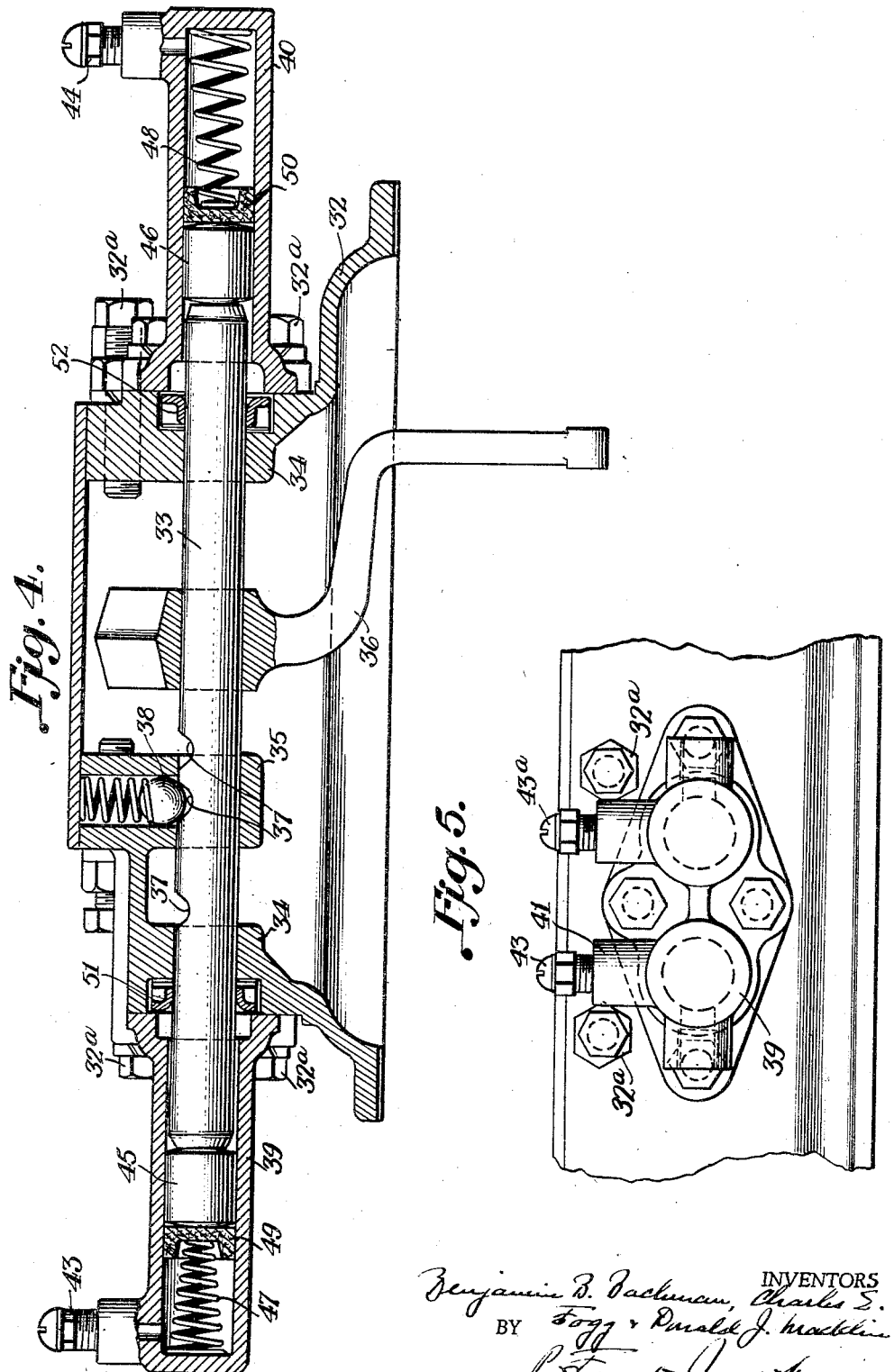

2,178,061

UNITED STATES PATENT OFFICE 2,178,061

GEAR SHIFTING SYSTEM

Benjamin B. Bachman, Philadelphia, Charles E. Fogg, Penfield, and Donald J. Macklin, Bala Cynwyd, Pa.

Application December 1, 1937, Serial No. 177,644

4 Claims. (Cl. 74—346)

This invention relates generally to power transmitting mechanisms and is more particularly directed to a method and means of conditioning a gear-set or transmission, as in motor vehicles, for functioning in a predetermined speed.

While our invention, as will become manifest from the following, may be practiced in the construction and operation of various types of automotive vehicles, as well as in other arts, for the purposes of this disclosure, it has been elected to treat it as it may be utilized in the construction and operation of self-propelled road vehicles, as omnibuses, trucks and the like. It will be understood, however, that this is merely illustrative and that it is not to be construed, in any sense, as a limitation of the scope of utility of the invention to this particular application.

As is well known, in many current omnibus and truck designs, the disposition of the power plant, including the associated clutch and transmission or change gear-set, with relation to the front end of the vehicle, or the driver's compartment, makes it necessary to locate the clutch actuating pedal and the gear-shifting lever, as well as the other foot-operated controls, in advance of the power plant, for convenient manipulation by the vehicle operator. This has involved resorting to the use of variously designed systems of rods and cooperating levers for translating the movements of the shifting lever into the requisite relatively opposite directional movements at the gear-set or transmission, for meshing the gears for the desired speeds.

While such systems, in the main, have proven satisfactory, their use in omnibus construction, especially, has presented numerous difficulties, because of the longer chassis and the design of the body. Further, it has been recognized that the location of the engine and the associated gear-set at the rear of an omnibus, would solve many problems in connection with operating and other requirements in vehicles of this class. However, the existing media for transmitting motion from the gear-shifting lever to the remote gear-set present installation and other obstacles that it has been difficult, if not impossible to surmount in a way which will eliminate frequent servicing and insure dependability in operation, while, at the same time, keeping the interior of the body free of obstructions, the latter of which, of course, is a most important desideratum in omnibus design and operation.

Therefore, the primary object of this invention is to eliminate those disadvantages that are inherent to the existing systems of so-called remote gear-set conditioning means, such as hereinbefore referred to, in an economical and commercially practical manner, by utilizing fluid pressure for translating the movement of the gear-shifting lever, or its equivalent, into the requisite movement at the gear-set or transmission for conditioning the gears for functioning in the selected speed ratio.

It is a further object of this invention to provide a system for conditioning a gear-set or transmission, as in an automotive vehicle, for functioning, at a point distant therefrom, by the manipulation of a lever, or equivalent actuator, in conformity with the standard gear-shifting movements of the conventional shifting lever, or otherwise, the actuation of the gear-shifting lever to its gear changing positions producing a responsive movement of a fluid effective at the gear-set or transmission for the performance of the gear changing operation.

Another object of this invention is to provide means for conditioning a gear-set or transmission remote from the point where the conditioning operation is initiated, for functioning in a selected speed, having the aforesaid characteristics and advantages, which, while primarily designed for new constructions, may be readily substituted in existing vehicles for the conditioning systems now in use, to operate in conjunction with the standard gear-set and shifting lever with which such vehicles may be equipped.

Further, it is an important objective of this invention to provide a gear-set conditioning system that will especially respond to the requirements of omnibus construction and operation, particularly in those designs in which the power-plant may be located in juxtaposition to the rear axle, either parallel to the longitudinal axis of the vehicle or transversely thereof, our system possessing a wide range of flexibility in adapting it for translating the shift lever movements into those requisite for selectively engaging the gears of the transmission.

Other objects and advantages flowing from the practicing of our invention will become evident as the description proceeds and we would have it clearly understood that we reserve unto ourselves all rights to the full range of equivalents, both in structure and avenues of use, to which we may be entitled under our invention in its broadest aspect.

In the accompanying drawings, we have elected to illustrate a preferred and practical embodiment of our invention which has a wide range of utility in motor-vehicle construction and operation and is especially adapted to omnibus requirements. Our invention, however, may take other forms, to meet specific demands of production and use, in the automotive and other fields wherein it may be applicable, within the purview of the appended claims.

In the drawings:

Figure 1 is a longitudinal sectional view of the housing and operating components of our system which cooperate with the shifting lever of a conventional type.

Figure 2 is a transverse section on the line 2—2 of the preceding figure.

Figure 3 is an end elevation of the housing shown in Figures 1 and 2, illustrating the fluid line connections.

Figure 4 is a longitudinal sectional view of the assembly of my system associated with the gear-set or transmission, which may be of the standard design, or otherwise, showing one gear-shifting fork and the slide by which it is carried and, Figure 5 is an end elevation of the structure shown in Figure 4.

Referring now to the drawings in detail, in which like characters of reference are employed to designate similar parts in the several views, 7 indicates the housing of the gear-shift lever unit of our system, having top and end walls 7a and 7b, 7c, preferably bolted or otherwise detachably secured thereto, as shown, said top embodying an upwardly projecting socket forming portion 8 for the reception of the complemental surface 9a of the shifting lever 9 for relative movement on intersecting axes, as in conventional constructions.

In the present showing, the usual slide rods 10 and 11, as in the standard four speed transmission, are mounted in suitable bearings within the housing 7, each of said rods including a jaw, as indicated at 12, in Figure 1, in which the toe 9b of the shifting lever 9 is adapted to be entered in response to the lateral rocking of said lever in conformity with standard usage. For convenience, in illustrating our invention, only one of the slide rods is shown in Figure 1 and it will be understood that the description of the layout and mode of operation of our system, as applied to this rod is also applicable to the other thereof.

As will be observed, the slide rod 10 (Fig. 1) when in its neutral position, with its jaw 12 alined for engagement by the toe 9b of the shift lever 9 is in positive contact at each end with the pistons 13 and 14, reciprocable within the cylinders 15 and 16, integral with the end walls 7b and 7c of the housing 7, the ends of the rod entering the inner ends of the respective cylinders as shown. Suitable packing, preferably of a flexible material, as indicated at 17 and 18 is located behind each of said pistons, the packings being preferably cup-shaped to provide seats for the coacting ends of the expansion springs 19 and 20, which, as herein shown, are of a truncated conical configuration, though they may take other forms, as may the packings and pistons. The other ends of the springs 19 and 20 abut upon the end walls of the respective cylinders in which they are disposed, it being manifest that said springs function to urge the pistons 13 and 14 into constant contact with the ends of the slide rod 10, so that, in effect the pistons are virtual continuations of the rod in the operation of our system, as hereinafter will become apparent.

Each of the cylinders 15 and 16, at its outer end, is formed with a right angular offset or boss, 15a and 16a, having a central bore communicating with the cylinder and threaded adjacent its outer end to receive the complementally threaded nipple, 22 and 23, or coupling, for connecting a line of copper or other flexible tubing (not shown) thereto. From the description thus far, it will be seen that when the toe of the shift lever 9 is entered in the jaw of the rod 10 and the lever rocked backwardly, the reverse movement of the toe will urge the rod 10 forwardly, moving the piston 13 with it to compress the spring 19, while the forward movement of the lever will produce an opposite movement of the slide 10 to compress the spring 20.

To locate the shifting lever 9 in neutral position, we dispose on either side of the longitudinal axis of the housing 7 spring actuated plungers 24 and 25, which may take any preferred form that will attain the objectives of our invention. In the present showing, the sides of the housing 7 in the center zone thereof, are provided with bearings 26 and 27 in which the hollow cylindrical plungers 24 and 25 may move longitudinally, under the influence of the expansion springs 28 and 29 and in response to opposing effort of the toe of the shifting lever 9, as the latter is rocked laterally on its fulcrum 8—9a. As will be noted, each of the plungers is formed with a flange, 24a, 25a, to limit its movement under the influence of its spring, one end of the latter bearing against the inner surface of the plunger head while the other abuts upon the wall of the fitting, 30, 31, of a box-like shape, bolted or otherwise fastened to the housing in the assembling of the plungers and springs therein, the heads of the respective plungers having a rounded or curved contour to facilitate the passage of the toe of the shift-lever thereover in its movements to and from neutral position.

The gear-set or transmission unit of our system, likewise includes two shifting rods, each carrying a fork keyed thereto and slidable within suitable bearings in the housing element 32, which is flanged for bolting to the transmission case, in accordance with the usual practice. In the present showing, the rod 33 slidable in the bearings 34 and 35, carries the usual fork 36 and is notched, as at 37 to receive the spring actuated ball 38 whereby the rod is latched in neutral gear-engaged positions, in the usual way.

Similarly to the housing 7, the ends of the housing 32 are detachably fastened thereto by bolts, as at 32a and embody cylinders 39 and 40, each of which terminates in a right angular offset portion or boss 41 and 42 centrally bored to communicate with the interior of the cylinder and threaded adjacent its outer end to receive a correspondingly threaded nipple or coupling, as indicated at 43 and 44, for the connection of the other end of the copper tubing leading from the housing 7 thereto. The rod 33, as will be seen, extends into the respective cylinders 39 and 40 to contact with the heads of the pistons 45 and 46 which are urged thereagainst by the springs 47 and 48, similar to the springs of the shifting lever unit, and likewise supported between the ends of the cylinders and the cup-shaped packings 49 and 50. Preferably, the bearings 34 are enlarged, adjacent the cylinders 39 and 40 for the reception of a packing ring, or other packing material, 51, 52 to prevent leakage of lubricant from the transmission into the cylinders 39 and 40.

In the installation of our system, the shift-lever unit is connected to the gear-set unit, by copper or other flexible tubing, as aforesaid, it being evident that the tubing may be run along the chassis frame of a vehicle, or otherwise located, and also lends itself to clearing obstructions that may present themselves in the vehicle layout, in a manner that would not be feasible in the installation of lever and rod systems of existing types, the leads from the forward end of the shift-lever unit being connected to the rear end nipples of the gear-set unit and vice versa. When the appropriate connections have been made, the fluid may be introduced to the respective lines, as at 53 and 54 (Fig. 1), or at any other suitable points in the system, it being obvious that the quantity of fluid in each line must be sufficient at all times, to completely fill the line, as between the piston 13 of the forward unit and the piston 46 of the gear-set unit, the fluid functioning as a non-compressible column between the two pistons, to transmit motion initiated at the gear shift-lever unit to that on the gear set.

Assuming that the rod 33 of the transmission unit carries the fork for meshing the gears for reverse speed, in response to the backward movement of said rod and for first speed forward when the rod is actuated in the reverse direction, these movements of the slide rod being identical with those of the corresponding rod of a standard type of transmission, with which the shifting lever is directly engageable, it will be evident that the forward movement of the shifting lever 9, following the pick-up of the rod 10 by the lateral movement of the lever to the left to cant its toe 9a in opposition to the plunger 24, will produce a backward movement of the rod 10. Since this rod is in contact with the piston 14, the latter will also move backwardly in opposition to its spring 20 simultaneously producing a corresponding movement of the fluid column in the line that is effective upon the piston 45 to urge the rod 33 of the gear-set unit rearwardly, until the ball latch enters the notch 37 nearest the forward end of said rod. At the same time, of course, the rearward movement of the piston 46 with the rod 33, results in an equal movement of the fluid column in the line in which the latter piston functions with the piston 13 of the shift-lever unit. From this, it will be seen that any movement of the rod 10, fore or aft, will produce a simultaneous movement of the fluid in the two lines between the shift-lever and gear-set units, in which the pistons 13 and 46 and 14 and 45 are active, as in a circuit, the rods of the respective units being held in constant contact with their cooperating pistons and moving in the same direction in a like amount.

The rearward movement of the shift lever, to the position for locating it in neutral, will actuate the rod 10 forwardly from its reverse gear engaging position, producing a similar movement of the shifting rod 33 of the gear-set unit and permitting the latch to enter the intermediate notch 37, the toe of the shift lever riding upon the plunger 24 to assume its neutral position. For conditioning the gear-set for first forward speed, the movements of the shift lever and of the respective rods are directionally opposite to those just described for meshing the reverse speed gears, while the movements of the rod 11 of the shift-lever unit and the shift rod carrying the second and high speed gear fork, when the shift lever is rocked or canted to the right, are backward to engage the second speed gears and forward for high speed, the nipple 22a at the front of the shift-lever unit and that at the forward end of the gear-set unit, 43a, forming parts of lines similar to those in which their companion nipples 22 and 43 function in the conditioning of the gear-set for operating in reverse and first forward speed, for producing the requisite movements of the second and high speed shift rod.

In the employment of our invention any suitable fluid may be utilized, preferably, where a liquid is used, one that is non-freezing and possesses a sufficient viscosity to act as a lubricant and prevent excessive wear in relatively movable parts, so that the system will require little or no attention in servicing over a long period of time. In this connection, it may be pointed out that the interconnected rods and levers of existing conditioning systems for gear-sets are subject to more or less rapid deterioration, resulting in lost motion which quickly becomes apparent in the manipulation of the shifting lever, whereas with the present system the movement of the lever is smooth and positive throughout the life of the system. Further, where replacement of parts may be necessary, because of accidents, or otherwise, this may be accomplished with facility and despatch and at a negligible cost. Obviously, in lieu of liquid, air or other fluid may be used for transmitting the movement of the rods of the gear-shifting lever unit to those of the gear-set unit, the respective lines being connected to a suitable source of supply or appliance, whereby such fluid may be maintained at a constant pressure for the functioning of the system as described, although a system in which a liquid of the correct type is employed will doubtless be found to be the most satisfactory with respect to production, installation and maintenance costs.

While this invention has been described more or less specifically, with reference to the embodiment herein shown and in its application to motor-vehicle construction and operation, it will be manifest that, as previously pointed out, the structural details and mode of assembly may be varied to meet different requirements of production and use, without departing from the spirit and scope thereof, as defined by the appended claims.

We claim:

1. In an automotive vehicle having a gear-set, a system for conditioning said gear-set for functioning, at a point remote therefrom, said system including a housing, a gear-shifting lever mounted thereon, a plurality of slide rods associated with said housing for engagement by said lever and movement therewith, shifter rods associated with said gear-set for sliding movement and means for effecting movement of one of said latter rods in response to the movement of a preselected slide rod engaged and actuated by said lever, said means including sealed passages between the respective ends of the slide rods and those of the shifter rods, pistons located in each of said passages in juxtaposition to the ends of the respective rods, spring means for maintaining said pistons in constant contact with the rod ends and a column of liquid between the pistons in each passage, the liquid columns being the sole media for transmitting motion from one rod to the other, and means intermediate the ends of said housing for maintaining said gear-shifting lever in neutral position, including oppositely located bearings, a plunger mounted in each bearing formed to engage with the end of said lever, and a spring cooperatively associated with each plunger and a fixed portion of its bearing to urge said plunger into yielding engagement with the lever end.

2. The combination with a gear-shifting lever mounted for rocking movement on intersecting axes and slide rods engageable by said lever for actuation therewith in fore and aft directions, of means for maintaining said lever in neutral, said means including oppositely disposed plungers adapted to engage the rod-engaging end of said lever, bearings for said plungers and spring means for urging said plungers toward said lever end, said plungers being adapted to yield in the lateral rocking movement of said lever to rod-engaging position, a gear-set having shifter slides and means for transmitting sliding motion from said slide rods to said shifter slides in response to the actuation of a selectable one of said slide rods by said lever, said means including pistons in spring-actuated engagement with the forward and rear ends of the respective slide rods and shifter slides, sealed passages extending from the piston at the forward end of a slide rod to that at the rear end of a shifter rod and from the piston at the rear end of the slide rod to that at the forward end of the shifter rod and a column of liquid within each of said passages connecting the slide rod and shifter slide pistons at each end thereof, whereby the two rods will move in unison and in the same amount.

3. In an automotive vehicle having a gear-set, a system for conditioning said gear-set for functioning from a point remote therefrom, said system including shifter rods associated with said gear-set for sliding movement, a closed chamber in juxtaposition to each end of a shifter rod, a piston mounted in each chamber, spring means for urging said piston into engagement with the adjacent end of the shifter rod, a fluid outlet from said chamber in advance of the head end of the piston therein, a gear-shifting lever distant from said gear-set, a mounting therefor, including a housing, a plurality of slide rods associated with said housing, each of said latter rods being adapted to be engaged by one end of said lever, oppositely disposed bearings located intermediate the ends of said housing, a plunger mounted in each bearing, spring means associated with said plungers and their respective bearings for urging said plungers outwardly of said bearings and stops for limiting such movement to space the opposed plungers for entry of the shift lever rod-engaging end therebetween for locating said lever in neutral position, said plungers being movable in opposition to their springs in response to the lateral movement of said lever to a rod-engaging position, a closed chamber in proximity to each end of a slide rod, a piston mounted in each chamber, spring means for maintaining said piston in continuous contact with the slide rod end, a fluid outlet from each latter chamber, in advance of the head end of the piston therein, tubing connecting the chamber at the forward end of each slide rod with that at the rear end of each shifter rod, tubing connecting the chamber at the rear end of each slide rod with that at the forward end of each shifter rod, through the medium of the respective fluid outlets, each tubing line and the connected chambers constituting a sealed passage and a column of liquid in each passage between the pistons at either end thereof, whereby a fore or aft movement of a slide rod in response to the movement of said lever when engaged therewith, will effect a simultaneous and co-extensive movement of a shifter rod in the reverse direction.

4. The combination with a system for shifting gears by fluid pressure, having a manually actuatable shifting lever and means for supporting said lever for movement on intersecting axes, of means for maintaining said lever in neutral position, said means comprising oppositely disposed bearings located intermediate the ends of said lever supporting means in the zone of the lower end of said lever, a plunger slidable in each bearing, spring means between each plunger and its bearing for urging the respective plungers toward the latter end of said lever and stops for limiting such movement to space the plungers for entry of the lever end therebetween and locating said lever in neutral position, said plungers being movable in opposition to their springs in response to a lateral movement of said lever for the execution of a gear shifting movement.

BENJAMIN B. BACHMAN.
CHARLES E. FOGG.
DONALD J. MACKLIN.